US011915571B2

(12) United States Patent
Updike et al.

(10) Patent No.: US 11,915,571 B2
(45) Date of Patent: Feb. 27, 2024

(54) SYSTEMS AND METHODS FOR DYNAMICALLY MONITORING DISTANCING USING A SPATIAL MONITORING PLATFORM

(71) Applicants: Joshua Updike, Shadow Hills, CA (US); Joseph White, Orlando, FL (US); Michael King, Orlando, FL (US); Natalie Concors, Orlando, FL (US)

(72) Inventors: Joshua Updike, Shadow Hills, CA (US); Joseph White, Orlando, FL (US); Michael King, Orlando, FL (US); Natalie Concors, Orlando, FL (US)

( * ) Notice: Subject to any disclaimer, the term of this patent is extended or adjusted under 35 U.S.C. 154(b) by 245 days.

(21) Appl. No.: 17/336,124

(22) Filed: Jun. 1, 2021

(65) Prior Publication Data
US 2021/0375117 A1   Dec. 2, 2021

Related U.S. Application Data

(60) Provisional application No. 63/033,500, filed on Jun. 2, 2020.

(51) Int. Cl.
| G08B 21/18 | (2006.01) |
| G06T 7/70 | (2017.01) |
| G08B 5/22 | (2006.01) |
| G06T 7/20 | (2017.01) |
| G06V 40/10 | (2022.01) |

(52) U.S. Cl.
CPC ............. *G08B 21/182* (2013.01); *G06T 7/20* (2013.01); *G06T 7/70* (2017.01); *G06V 40/10* (2022.01); *G08B 5/22* (2013.01); *G06T 2207/30196* (2013.01); *G06T 2207/30232* (2013.01)

(58) Field of Classification Search
CPC ........... G08B 21/182; G06T 7/70; G06T 7/20; G06T 2207/30196; G06T 2207/30232; G06V 40/10
See application file for complete search history.

(56) References Cited

U.S. PATENT DOCUMENTS

| 5,396,227 A * | 3/1995 | Carroll ..................... G07C 9/28 340/10.5 |
| 9,357,183 B2 * | 5/2016 | Cordero ........... G08B 13/19636 |
| 9,424,734 B1 * | 8/2016 | Hagi ...................... G08B 21/22 |
| 10,402,634 B2 * | 9/2019 | Kozakaya ............ G06V 10/764 |
| 10,535,146 B1 * | 1/2020 | Buibas ................. G06V 40/103 |
| 2007/0194944 A1 * | 8/2007 | Galera ...................... F16P 3/14 340/686.6 |
| 2011/0157486 A1 * | 6/2011 | Murata .................. G08B 7/062 353/11 |

(Continued)

*Primary Examiner* — Steven Lim
*Assistant Examiner* — Son M Tang
(74) *Attorney, Agent, or Firm* — Eric R. Garcia, Esq.

(57) ABSTRACT

A dynamic spatial monitoring platform is disclosed that provides improved management and compliance with guest-spacing requirements. The spatial monitoring platform may include a plurality of tracking modules that are configured to capture environmental data of an environment with guests. The environmental data is processed to identify spacing or distancing between guests and in response, cause one or more images to be displayed or projected by the tracking modules to provide visual feedback to one or more guests relating to their spatial relationship with other guests.

17 Claims, 8 Drawing Sheets

(56) References Cited

U.S. PATENT DOCUMENTS

| | | | |
|---|---|---|---|
| 2011/0267179 A1* | 11/2011 | Patterson | G08B 7/066 |
| | | | 340/286.02 |
| 2013/0194390 A1* | 8/2013 | Hirooka | G01C 11/025 |
| | | | 348/47 |
| 2014/0001964 A1* | 1/2014 | Ono | H05B 47/10 |
| | | | 315/153 |
| 2014/0348382 A1* | 11/2014 | Sasatani | G06V 20/53 |
| | | | 382/103 |
| 2016/0127657 A1* | 5/2016 | Mukai | G06V 10/42 |
| | | | 348/218.1 |
| 2016/0223395 A1* | 8/2016 | Cohn | F24F 11/30 |
| 2016/0267322 A1* | 9/2016 | Miura | G06V 10/22 |
| 2016/0342830 A1* | 11/2016 | Ariizumi | G06V 20/64 |
| 2017/0160626 A1* | 6/2017 | Muramatsu | H04N 23/69 |
| 2017/0337820 A1* | 11/2017 | Glatfelter | G08G 1/166 |
| 2018/0061371 A1* | 3/2018 | Uema | G09G 5/14 |
| 2018/0276458 A1* | 9/2018 | Kawahara | G06V 20/53 |
| 2019/0139253 A1* | 5/2019 | Mochizuki | G06F 3/147 |
| 2019/0139254 A1* | 5/2019 | Mochizuki | G06F 3/147 |
| 2020/0388040 A1* | 12/2020 | Otake | G06V 20/52 |
| 2021/0125350 A1* | 4/2021 | Chinnam | G06T 7/248 |
| 2021/0398298 A1* | 12/2021 | Kisara | G06T 7/292 |
| 2022/0012911 A1* | 1/2022 | Townsend | G06T 7/74 |
| 2022/0277162 A1* | 9/2022 | Putterman | G06V 40/173 |
| 2023/0298166 A1* | 9/2023 | Nakano | G06T 7/00 |
| | | | 382/103 |

* cited by examiner

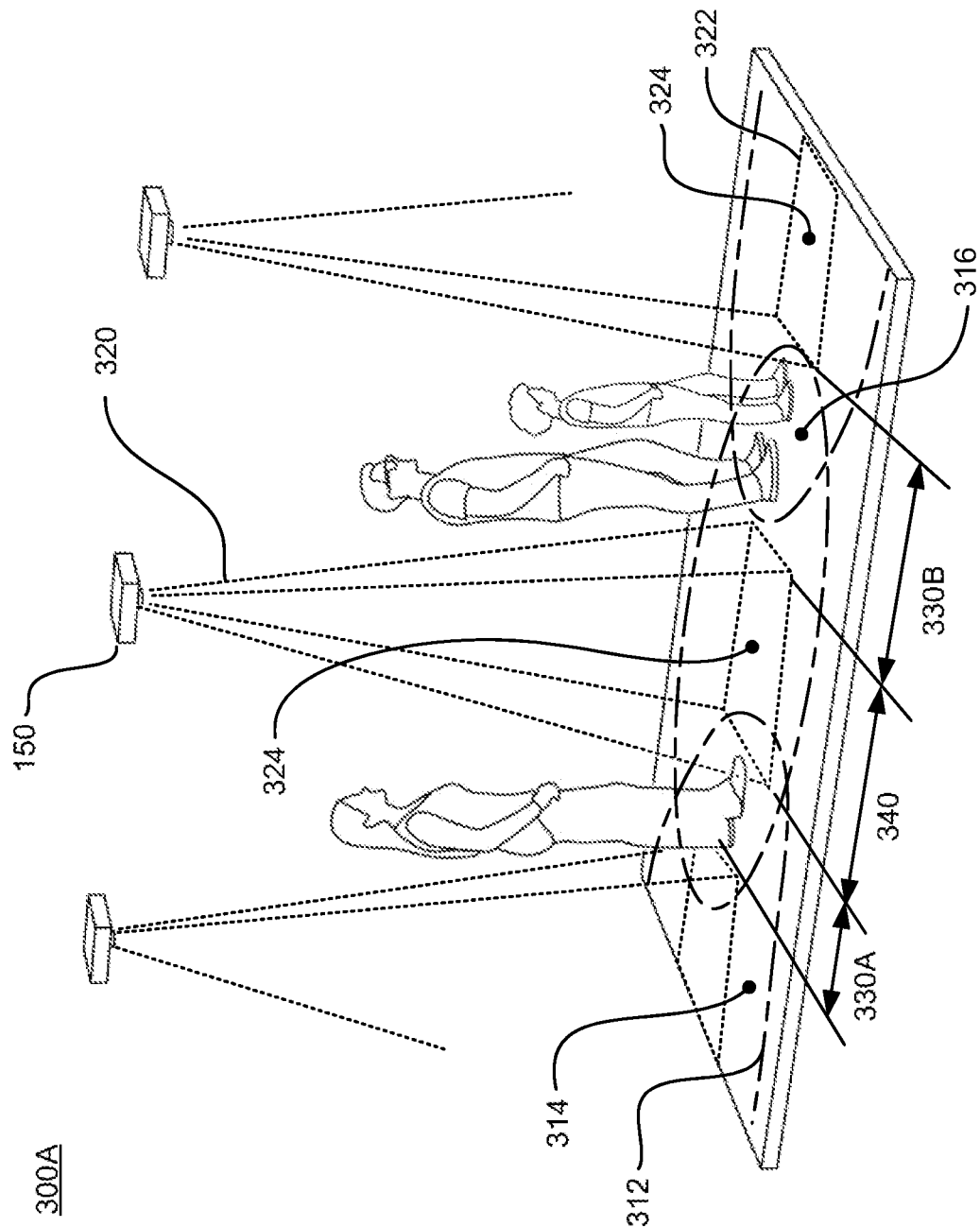

SYSTEMS AND METHODS FOR DYNAMICALLY MONITORING DISTANCING USING A SPATIAL MONITORING PLATFORM

CROSS-REFERENCE TO RELATED APPLICATION

The present application claims the priority benefit of U.S. patent application No. 63/033,500, filed Jun. 2, 2020, entitled "SYSTEMS AND METHODS FOR DYNAMICALLY MONITORING DISTANCING USING A SPATIAL MONITORING PLATFORM," the disclosure of which is incorporated herein by reference.

TECHNICAL FIELD

The present invention generally relates to systems and methods for monitoring distancing, and more particularly to a system and method for dynamically monitoring spatial distances (interstitial distances) between people using a spatial monitoring platform.

BACKGROUND

Physical spacing between people is a known method to prevent the communication of infectious diseases, such as the flu or other highly contagious diseases. During an outbreak, maintaining physical distance becomes more important, particularly where local regulations may require such distancing to prevent the communicable spread of disease. Conventional social distancing mechanisms, however, rely on static demarcations that are not dynamic and require people to self-monitor spacing to maintain compliance with spacing requirements.

SUMMARY

According to various aspects of the subject technology, a dynamic spatial monitoring platform is disclosed that provides improved management and compliance with guest-spacing requirements. The spatial monitoring platform may include a plurality of tracking modules that are configured to capture environmental data of an environment with people/guests. The environmental data is processed to identify spacing or distancing between guests and in response, cause one or more images to be displayed or projected by the tracking modules to provide visual feedback to one or more guests relating to their spatial relationship with other guests.

According to aspects of the subject technology, the spatial monitoring platform may include one or more image processing modules, for example, that are configured to process the environmental data captured by the plurality of tracking modules to identify spacing or distancing between guests. Depending on the desired implementation, the image processing modules may be instantiated on-device, i.e., using one or more processors that are built into a discrete system that is configured to capture environmental data. In other implementations, the image processing modules may be operated using one or more remote computing nodes, such as one or more servers, or virtualized routines (e.g., virtual machines, or containers, etc.), that are part of a cloud-based computing infrastructure. The platform also includes a graphics module that is configured to render or identify an image from a database, to display or project at the environment, to provide visual feedback to the one or more guests relating to their spatial relationship with other guests. In some aspects, the platform may also include an administration module that is configured to set parameters for the platform, such as spacing requirements, and notification parameters, such as users to notify in the event of non-compliance with spacing requirements by a guest.

According to other aspects of the subject technology, the spatial monitoring platform is configured to accommodate groupings of guests, such as a guest party consisting of a parent and child, by increasing a distance between the party and other guests to enable members of the party to move about a larger footprint without encroaching on a distance spacing requirement of a neighboring guest. For example, the spatial monitoring platform can be configured to identify social groups, and to adjust spatial distance parameters to accommodate the social group by, for example, allocating a larger area for the social group to occupy and/or increasing a distance between the social group and neighboring guests.

According to other aspects of the subject technology, the plurality of tracking modules are configured to seamlessly hand off environmental data collected from a particular tracking module to an adjacent tracking module to enable continuous monitoring of a particular guest, or guest group as they traverse the environment.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 3A illustrates an exemplary environment utilizing a spatial monitoring platform in accordance with various aspects of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

The disclosed subject matter describes systems and methods for dynamically monitoring spatial distancing between guests. The spatial monitoring platform may include a plurality of tracking modules that are configured to capture environmental data of an environment with guests. The environmental data is processed to identify spacing or distancing between guests and in response, cause one or more images to be displayed or projected by the tracking modules to provide visual feedback to one or more guests relating to their spatial relationship with other guests.

The disclosed technology addresses the need in the art for more effective monitoring of spatial distancing between guests by utilizing a platform to collect real-time environmental data representing an environment with guests or people, analyzing the environmental data to determine spacing between guests, and in response to the determined spacing, cause an image to be projected at the environment providing feedback to the guest regarding compliance with distancing requirements.

Figure 1:
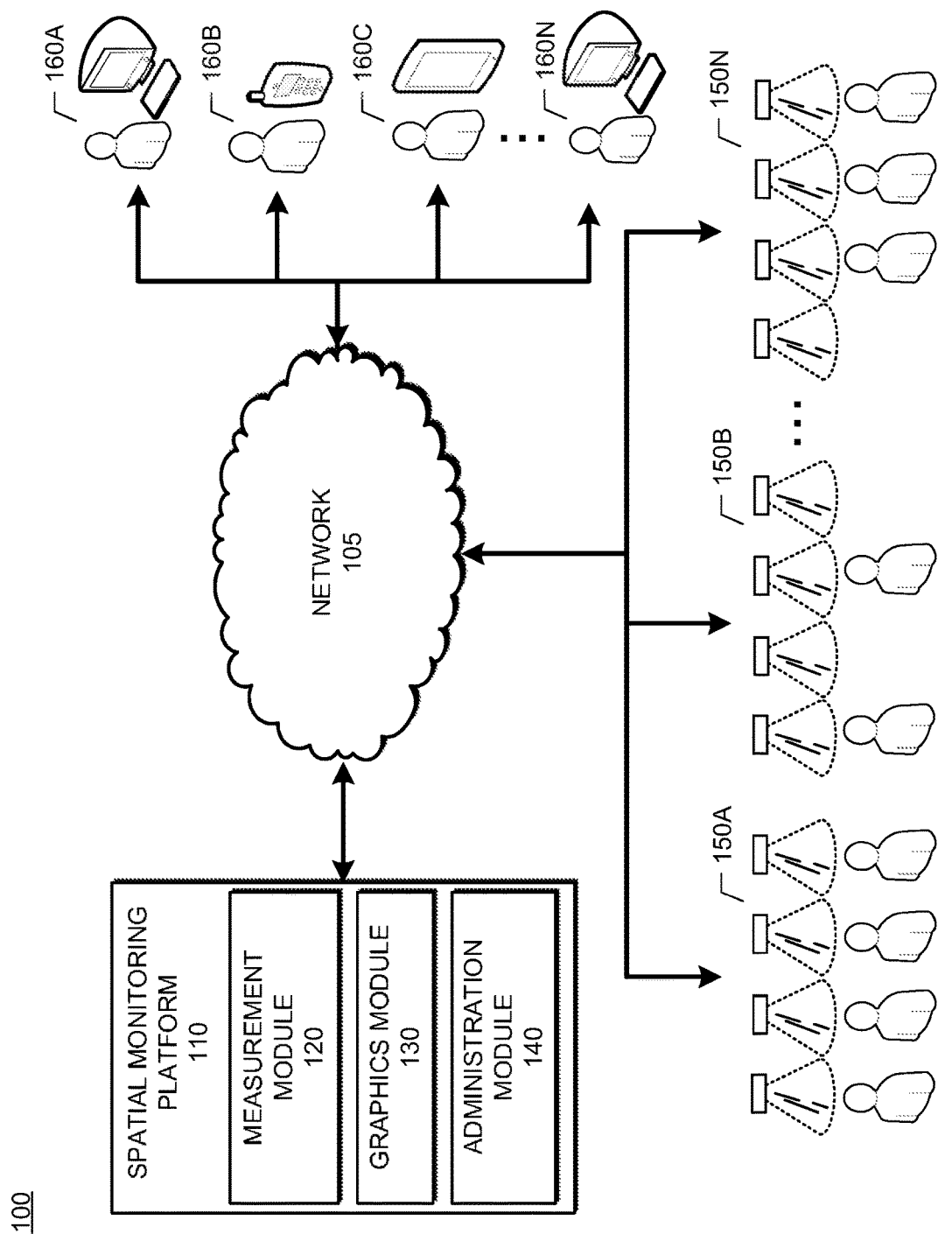
FIG. 1 illustrates a conceptual diagram illustrating an example network environment utilizing a spatial monitoring platform, in accordance with various aspects of the subject technology.

FIG. 1 illustrates a conceptual diagram illustrating an example network environment 100 utilizing a spatial monitoring platform 110, in accordance with various aspects of the subject technology. In one aspect, the spatial monitoring platform 110 may comprise one or more servers connected via a network 105. In this configuration, the spatial monitoring platform 110 may be configured to communicate with a plurality of tracking modules 150A-N and one or more client devices 160A-N via the network 105. Users may access the platform 110 via the client devices 160A-N. The spatial monitoring platform 110 may include one or more machine-readable instructions, which may include one or more of a measurement module 120, a graphics module 130, an administration module 140, and/or other instruction modules. In another aspect, one or more modules of the spatial monitoring platform 110 (e.g., measurement module 120, graphics module 130, administration module 140) may be included in one or more of the tracking modules 150A-N. In this configuration, the plurality of tracking modules 150A-N may be networked with each other via the network 105, as well as one or more client devices 160A-N via the network 105.

The network 105 can include, for example, one or more cellular networks, a satellite network, a personal area network (PAN), a local area network (LAN), a wide area network (WAN), a broadband network (BBN), and/or a network of networks, such as the Internet, etc. Further, the network 105 can include, but is not limited to, any one or more of the following network topologies, including a bus network, a star network, a ring network, a mesh network, a star-bus network, tree or hierarchical network, and the like.

The spatial monitoring platform 110 includes at least one processor, a memory, and communications capability for receiving environmental data from the plurality of trackers 150A-N and for providing notifications to the client devices 160A-N. In some example aspects, the spatial monitoring platform 110 can be a single computing device such as a single computing device. In other embodiments, the spatial monitoring platform 110 can represent more than one computing device working together (e.g., in a cloud computing configuration).

The platform 110 includes a measurement module 120. The measurement module 120 is configured to receive and analyze environmental data captured by the plurality of tracking modules 150A-N to identify individual guests and groupings of guests. For example, each of the tracking modules 105A-N may be configured or positioned to monitor a discrete area, for example, inside a theme park, convention venue, retail store, theatre, casino, airport, museum, etc. The area monitored by each individual tracking module may correspond with an area on the ground beneath or adjacent to the tracking module's location, which may be indoor or outdoor, depending on the desired implementation. By way of example, one or more tracking modules may be installed above or adjacent to an area where a queue is forming for a theme park attraction or for a retail sales counter. In some aspects, each tracking module may be configured to monitor non-overlapping portions of a larger area e.g., a theatre lobby. By way of example, tracking module 150A and 150B can be configured to monitor separate areas within the same venue. Alternatively, one or more of the tracking modules 105A-N may be configured to monitor overlapping areas. By way of example, tracking module 150A and 150B may be configured to monitor overlapping areas adjacent to a theme park attraction where a queue is formed.

Tracking modules 150 can include one or more devices that are configured to collect environmental data, for example, of an adjacent physical space. By way of example, tracking modules 150 may be mounting on a wall or ceiling surface such that collected environmental data includes images or other data representing one or more persons and or objects in the corresponding physical space. By way of example, the tracking modules 150 can include one or more Charge Coupled Devices (e.g., CCD cameras), infrared cameras, Light Detection and Ranging (LiDAR) sensors, motion detection (MD) sensors, and the like. It is understood that other sensor devices are contemplated, without departing from the scope of the disclosed technology.

In one example, the environmental data may be captured by a camera, for example, to generate image data, whereby the measurement module is configured to process the image data to identify objects and/or people guests within the image data using image processing. Image processing methods may include machine-learning algorithms, artificial intelligence, or other processing methods as would be understood by a person of ordinary skill in the art to identify humans within the image data. In another example, the captured environmental data may represent heat maps that may be processed to identify individual guests and groupings of guests within the data. The captured environmental data may include other types of data to be used to identify individual guests and groupings of guests, such as data collected from infrared, radar, acoustic, or sonar systems, etc.

The measurement module 120 may, for example, process the image data received from the tracking modules 150A-N to identify a location of a guest's hands and/or feet to define a boundary that may be used to measure a physical distance between that particular guest, and other neighboring guests.

The measurement module 120 may also be configured to process the environmental data to identify physical characteristics or dimensions of the environment.

Based on the distance measurement determined by the measurement module 120, the graphics module 130 may be configured to render an image or graphic for projection or display to inform a guest of their compliance or non-compliance with distancing requirements. By way of example, the graphic may be a proximity indicator that is displayed in an interstitial space between two or more guests, for example to visually indicate an amount of space that should be kept between the guests in order to comport with a special distancing requirement.

In another example, the graphics module 130 may be configured to select an image or graphic from a database for projection or display at the environment to inform a guest of their compliance or non-compliance with spatial distancing requirements. Visual indications of spacing compliance (or non-compliance) may be communicated using different shapes, colors, or graphic movement patterns. For example, the images or graphics may include a green rectangle, orange rectangle, and a red rectangle. The green rectangle may be selected for projection to inform a guest that they are maintaining acceptable distancing from a neighboring guest. The orange rectangle may be selected for projection to inform a guest that they are encroaching a neighboring guest beyond a predetermined amount, and as a result, should move away from the neighboring guest. The red rectangle may be selected for projection to inform a guest that they are violating acceptable distancing requirements and should immediately move away. As another example, the images or graphics may include a green circle, orange circle and red circle. The green circle may be selected for projection to inform a guest of an acceptable area for the guest to move within. The orange circle may be selected for projection to inform a guest that they are encroaching on an area of a neighboring guest. The red circle may be selected for projection to inform a guest that they are violating acceptable distancing requirements and should immediately move away. It is understood that other images and graphics may be stored and selected to inform a guest of their spatial distancing status, as would be understood by a person of ordinary skill in the art.

The administration module 140 may be configured to communicate with a user via the client device 160A-N. The client device 160A-N may be capable of running an application and communicating with the spatial monitoring platform 110, to receive system parameters from the user such as minimum distance requirements (e.g., 6 feet), desired distance spacing between guests (7 feet for single-party guests, 10 feet for parties of two guests, 11 feet for parties of three guests, etc.), feedback preferences to non-compliant guests (e.g., visual only, audio and visual, animated visual, audio only), and notification preferences (e.g., send SMS message to employee, send notification via an internal messaging system, dial a phone number, send an email, etc.). In one aspect, the spatial monitoring platform 110 may transmit notifications to the client device 160A-N to alert a user (e.g., employee) of a repeat violator to enforce distancing requirements. In another aspect, output generated by the measurement module 120 and/or the graphics module 130 may be displayed to a user (e.g., employee or operator) via the client device 160A-N.

In another aspect, system parameters may be set based a particular location of the tracking modules 150A-N. For example, if a first plurality of tracking modules 150A are located outdoors, the minimum distance requirements may be set to a less restrictive amount, such as 5 feet. If a second plurality of tracking modules 150B are located indoors in a confined area, the minimum distance requirements may be set to a more restrictive amount, such as 8 feet. As such, the plurality of tracking modules 150A-N may be managed by zones, and have customized settings based on their particular location within the environment.

The client device 160A-N may be a mobile phone, PDA, portable media player, tablet, laptop, or other appropriate computing device, and may utilize a touch sensitive user interface, such as a touch-sensitive screen, to receive user input. The touch screen of the client device 160A-N may be built into the device itself, or can be electronically connected to the device (e.g., as a peripheral device). The user input may comprise gestures or touch. In some example aspects, the client device 160A-N may be any machine with appropriate hardware/software to launch and run one or more applications or software.

One or more of the applications may include application data comprising a graphical user interface. The application may thus, be configured to receive user input using the graphical user interface and the touch-sensitive screen. The application's graphical user interface may include touch elements that are displayed to the user and configured to trigger an application function based on user input.

The plurality of tracking modules 150A-N may each include a sensor and a projector. The sensor may be an image sensor, such as a camera, to capture environmental data for processing by the measurement module 120. The projector is configured to present an image or graphic, static or dynamic, to inform a guest of their compliance with spatial distancing requirements. In other aspects, the sensor and projector may be separate discrete components that are individually mounted. The plurality of tracking modules 150A-N may be located in an array at one or more locations to capture environmental data and provide feedback to guests.

Figure 2:
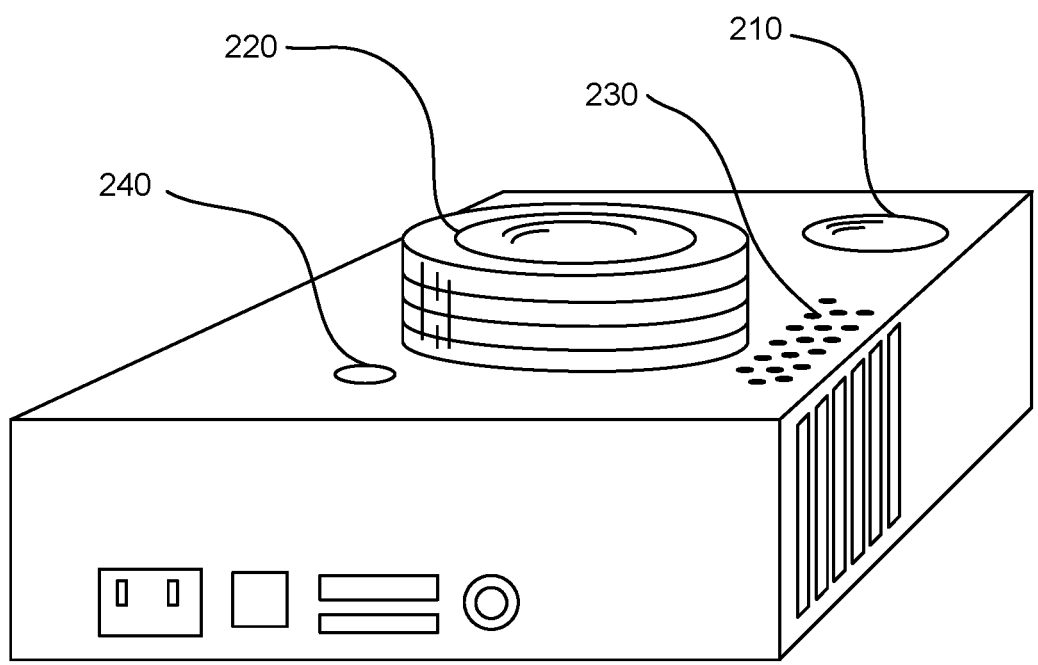
FIG. 2 illustrates a perspective view of a tracking module, in accordance with various aspects of the subject technology.

FIG. 2 illustrates a perspective view of a tracking module 150, in accordance with various aspects of the subject technology. The tracking module 150 may include a camera 210, a projector 220, a speaker 230, and an IR port for receiving commands from a remote control. The camera 210 is configured to capture image data for processing to identify guests and distancing between guests. The projector 230 is configured to project one or more images to provide feedback to one or more guests. The speaker 230 is configured to provide auditory feedback to one or more guests.

FIG. 3A illustrates an exemplary environment 300A utilizing a spatial monitoring platform in accordance with various aspects of the subject technology. The environment 300A includes a plurality of tracking modules 150 mounted overhead. Each tracking module 150 is configured to project 320 an image or graphic 324 between guests using a projector. The projected graphic 324 has a boundary 322 that demarcates an area between guests that should remain clear, in order to enforce spatial distancing requirements. The area bounded by boundary 322 has a length of a first distance 340 that may be defined by a user (e.g., employee or operator) to ensure compliance with spatial distancing requirements. As described above, the projected graphic 324 may comprise a static or dynamic image, video, or other feedback mechanism that is intended to inform guests of an area that should remain unoccupied. The projected graphic 324 may include symbols or markers indicating spaces guests are encouraged not to occupy, and may further indicate real-time distance measurements between guests to encourage distancing.

In one aspect, each tracking module 150 utilizes a camera to capture image data for a monitored area 314 within a predefined boundary 312. The image data for the monitored area 314 is processed by the measurement module (as shown in FIG. 1) to identify guests that are located within the monitored area 314, and if a guest is found, further processed to measure a distance between the guest in the monitored area 314 and other neighboring guests that may also be present in the monitored area 314.

In some aspects, image data captured by a first tracking module 150 may be processed in conjunction with image data captured by a neighboring second tracking module 150 to identify guests that are located within a monitored area 314 associated with the first tracking module 150 and guests that are located within a monitored area 314 associated with the second tracking module 150. By processing image date from the first and second tracking modules 150 together, the measurement module (as shown in FIG. 1) may measure a distance between guests in the monitored area 314 associated with the first tracking module 150 and other neighboring guests in the monitored area 314 associated with the second tracking module 150. In one aspect, to ensure that a guest is continually monitored as the guest traverses across the monitored area 314 associated with the first tracking module 150 to the monitored area 314 associated with the second tracking module 150, the monitored area 314 of the first and second tracking modules 150 includes an overlap area 316 that enables a hand-off from the first tracking module 150 to the second tracking module 150. The overlap area 316 thus enables a seamlessly hand-off between one tracking module to another.

In another aspect, the spatial monitoring platform may be configured to identify parties comprising two or more guests in order to managed parties differently from single guests. For example, if a party of two guests is identified by the measurement module (as shown in FIG. 1), the measurement module may be configured to adjust spatial distance parameters to accommodate the larger party so that members of the party are free to move about a larger area, than would otherwise be allowed for a single guest. Referring to FIG. 3A, a single guest may be allotted a first occupiable area having a distance 330A, and a party comprising two guests may have a second occupiable area having a distance 330B that is larger than the distance 330A. In addition to allotting a larger occupiable area for parties, the spatial monitoring platform may also increase the distance 340 between neighboring guests in order to create a buffer to prevent excessive corrective alarms or warnings as a party of two or more guests will naturally wonder over a larger area than a single guest. In other aspects, the spatial monitoring platform may also delay corrective feedback for parties by enlarging an amount of time between detection of a member of a party straying outside of an occupiable area, to the issuance of a warning, as members of parties tend to stay together and not wonder far apart. In yet another aspect, should the tracking modules 150 be configured to project an image or graphic representing an occupiable area (as shown in FIGS. 4A & 4B), the graphics module (as shown in FIG. 1) may be configured to increase a size of the image or graphic, or select a larger image or graphic from an image database or store, to accommodate the party of two or more guests.

The spatial monitoring platform may further be configured to automatically detect parties of two or more guests. For example, image data may be processed by the measurement module (as shown in FIG. 1) to identify parties consisting of more than two guests. Such processing may include identifying a particular hand gesture from an employee or operator that signals to the spatial monitoring platform, a grouping of guests. Such gestures may include a particular wave of an arm, hand, or finger motion. To confirm that such gesture was accurately captured, a client device associated with the employee or operator may display a confirmation. Alternatively, the tracking module 150 which captured the gesture, may emit an audible acknowledgment, blink a light, or project a confirmation message indicating that a party has been formed and will be dynamically managed in accordance with system preferences (as discussed above). In another example, an employee or operator may designate parties of two or more guests using the client device via user input. In yet another aspect, the measurement module (as shown in FIG. 1) may be configured to detect close proximity between two or more guests for a predetermined amount of time.

In other aspects, the spatial monitoring platform may further be configured to automatically disengage spatial distancing requirements for areas where population density is below a specific threshold, or auto-engage in areas where a lot of guests are beginning to congregate. For example, the measurement module (as shown in FIG. 1) may be configured to measure density of guests amongst a plurality of tracking modules 150. Should the measured density be above a certain threshold for a given area, the spatial monitoring platform may be automatically engaged to implement and monitoring spatial distancing requirements. Conversely, should the measurement module (as shown in FIG. 1) determine that density of guests amongst a plurality of tracking modules 150 is below a certain minimal threshold for a given area, the spatial monitoring platform may be automatically disengaged.

Figure 3B:
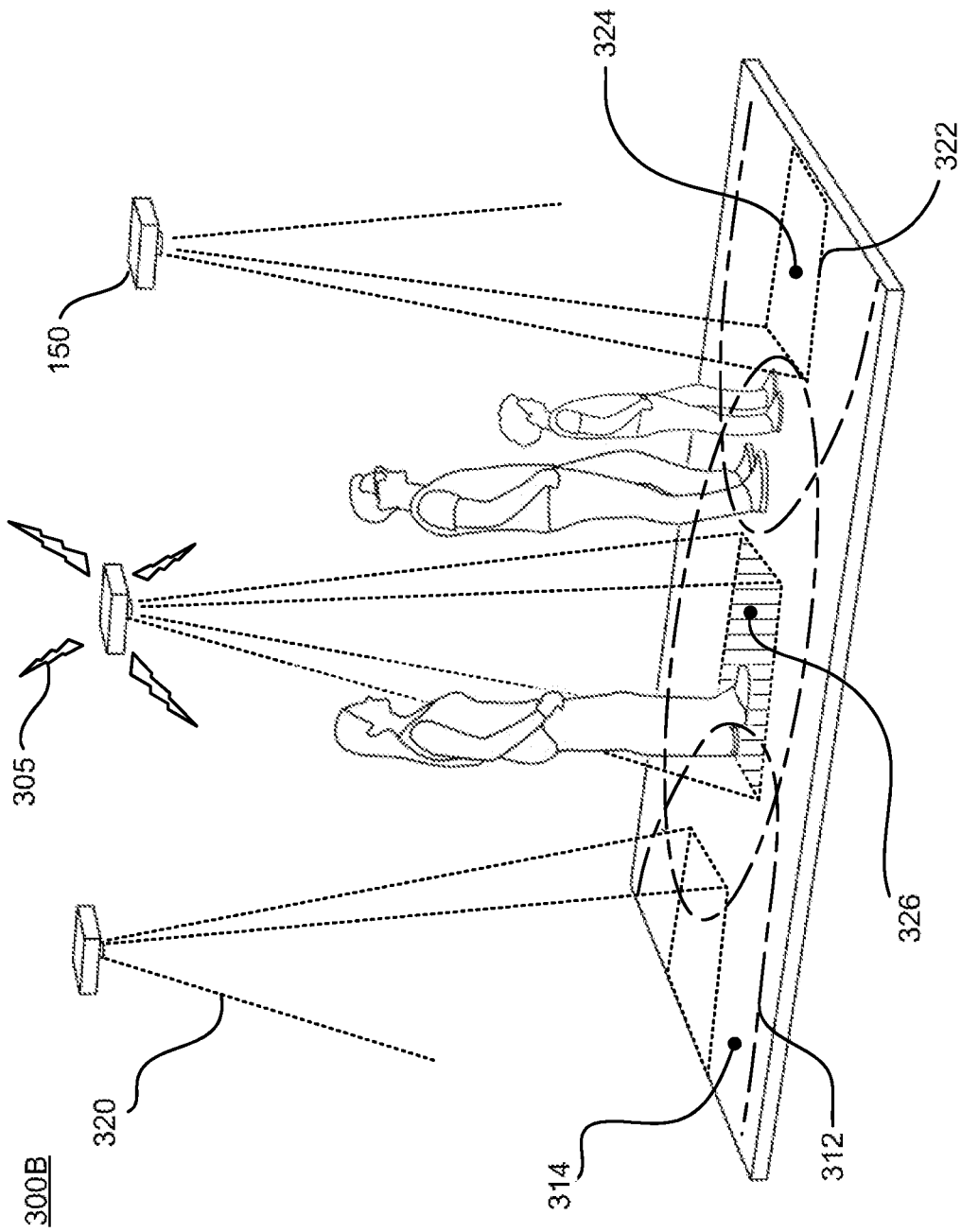
FIG. 3B illustrates an exemplary environment utilizing a spatial monitoring platform in accordance with various aspects of the subject technology.
Figure 4A:
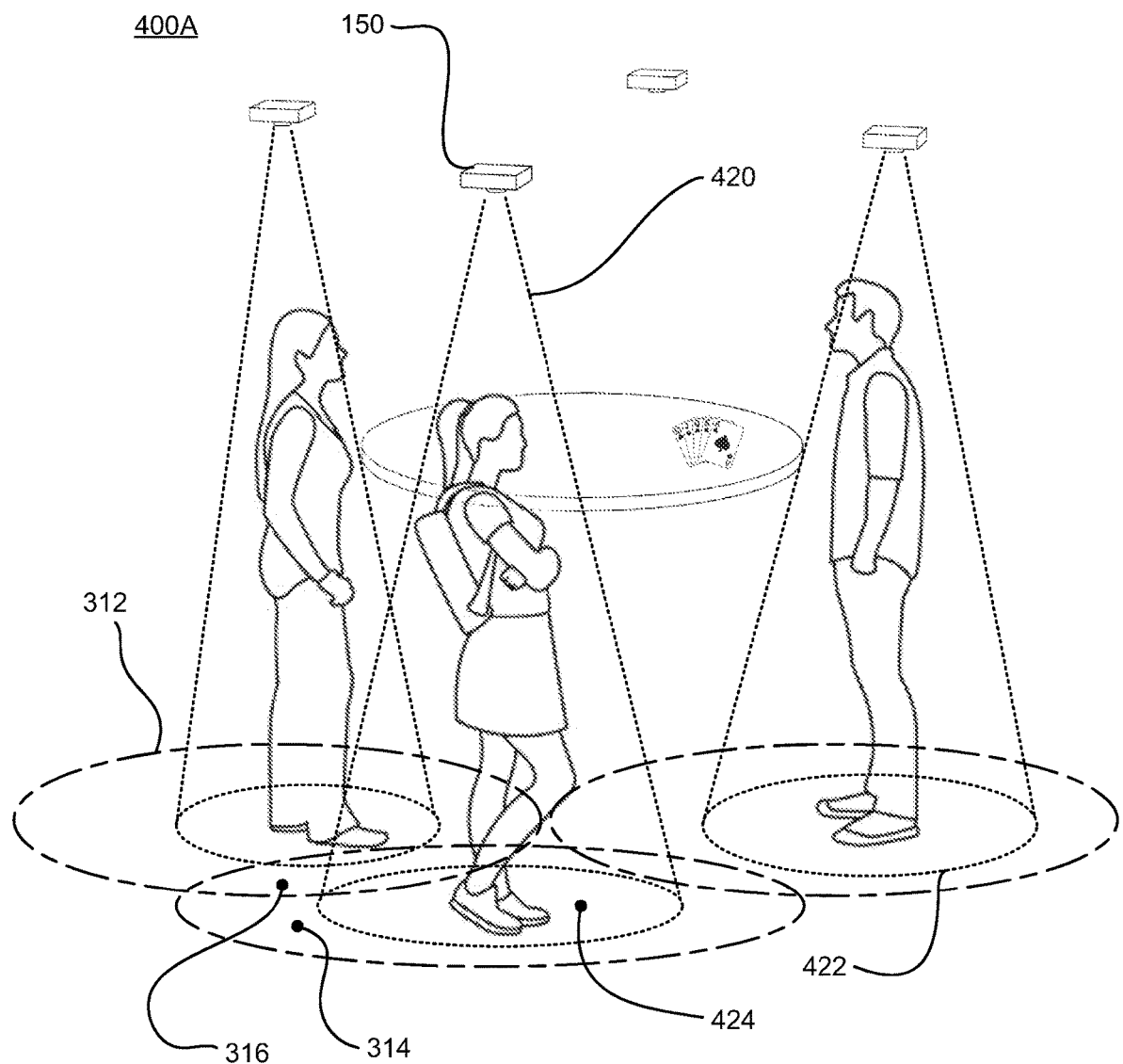
FIG. 4A illustrates an exemplary environment utilizing a spatial monitoring platform in accordance with various aspects of the subject technology.
Figure 4B:
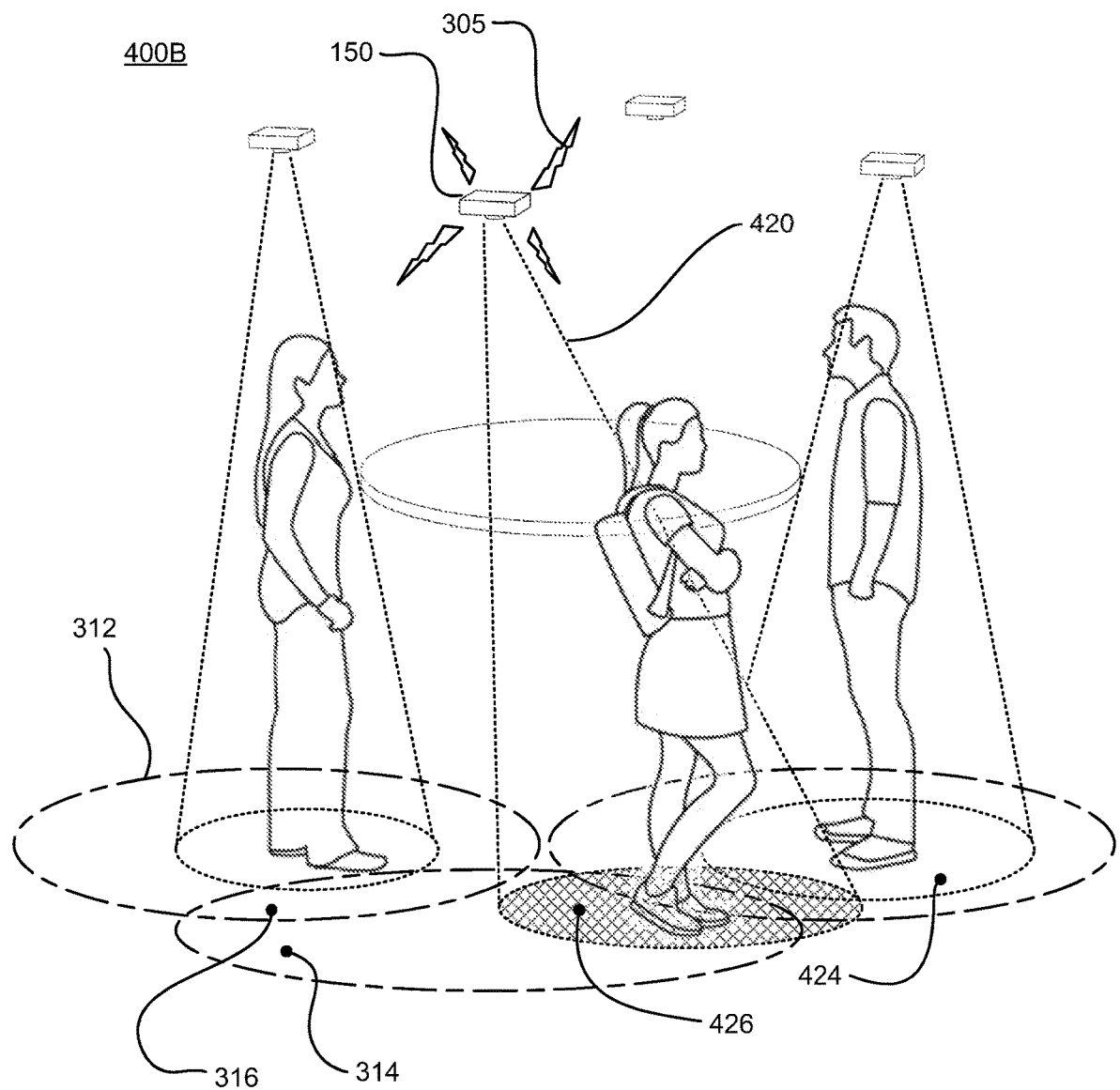
FIG. 4B illustrates an exemplary environment utilizing a spatial monitoring platform in accordance with various aspects of the subject technology.

FIG. 3B illustrates an exemplary environment 300B utilizing a spatial monitoring platform in accordance with various aspects of the subject technology. As shown, should a guest encroach within the projected graphic 324 that demarcates an area between guests that should remain clear, the spatial monitoring platform causes a warning graphic 326 to be projected to warn and inform the guest that they have encroached on the required spatial distance. Specifically, the graphics module (as shown in FIG. 1) renders or selects an appropriate graphic to alert and warn the guest that they are too close to a neighboring guest. The warning graphic 326 may comprise a static image, video, or other feedback mechanism that is intended to draw the attention of the guest. The warning graphic 326 may include color changes, animation (e.g., shaking of boundary 322, flashing of boundary 322, etc.), and/or audible alarms 305 that are emitted from one or more tracking modules 150 or localized speakers.

FIG. 4A illustrates an exemplary environment 400A utilizing a spatial monitoring platform in accordance with various aspects of the subject technology. The environment 400A includes a plurality of tracking modules 150 mounted overhead. Each tracking module 150 is configured to project 420 an image or graphic 424 representing an occupiable area using a projector. The projected graphic 424 has a boundary 422 that demarcates an occupiable area that guests should occupy, in order to enforce spatial distancing requirements. As described above, the projected graphic 424 may comprise a static or dynamic image, video, or other feedback mechanism that is intended to inform guests of an area that should remain occupied. The projected graphic 424 may also include symbols or markers indicating spaces guests are encouraged to occupy.

In one aspect, each tracking module 150 utilizes a camera to capture image data for a monitored area 314 within a predefined boundary 312. The image data for the monitored area 314 is processed by the measurement module (as shown in FIG. 1) to identify guests located within the monitored area 314, and if a guest is found, further processed to measure a distance between the guest in the monitored area 314 and other neighboring guests. For example, in the illustrated example, tracking modules 150 can monitor multiple areas (314, 316) to identify and locate each of the guests/people located therein. That is, each of the tracking modules can be operated together to monitor a larger area.

For example, image data captured by a first tracking module 150 may be processed in conjunction with image data captured by a neighboring second tracking module 150 to identify guests that are located within a monitored area 314 associated with the first tracking module 150 and guests that are located within a monitored area 314 associated with the second tracking module 150. By processing image date from the first and second tracking modules 150 together, the measurement module (as shown in FIG. 1) may measure a distance between guests in the monitored area 314 associated with the first tracking module 150 and other neighboring guests in the monitored area 314 associated with the second tracking module 150. In one aspect, to ensure that a guest is continually monitored as the guest traverses across the monitored area 314 associated with the first tracking module 150 to the monitored area 314 associated with the second tracking module 150, the monitored area 314 of the first and second tracking modules 150 includes an overlap area 316 that enables a hand-off from the first tracking module 150 to the second tracking module 150. The overlap area 316 thus enables a seamless hand-off between tracking modules.

FIG. 4B illustrates an exemplary environment 400B utilizing a spatial monitoring platform in accordance with various aspects of the subject technology. As shown, should a projected graphic 424 associated with a particular guest encroach within the projected graphic 424 of another guest, the projected area 424 for the encroaching guest is replaced with a warning graphic 426 to alert and inform the encroaching guest that they have encroached within an occupiable area of another guest. Specifically, the graphics module (as shown in FIG. 1) renders or selects an appropriate graphic to alert and warn the guest that they are too close to a neighboring guest. The warning graphic 426 may comprise a static image, video, or other feedback mechanism that is intended to draw the attention of the guest. The warning graphic 426 may include color changes, animation (e.g., shaking of boundary 422, flashing of boundary 422, etc.), and/or audible alarms 305 that are emitted from one or more tracking modules 150 or localized speakers.

Figure 5:
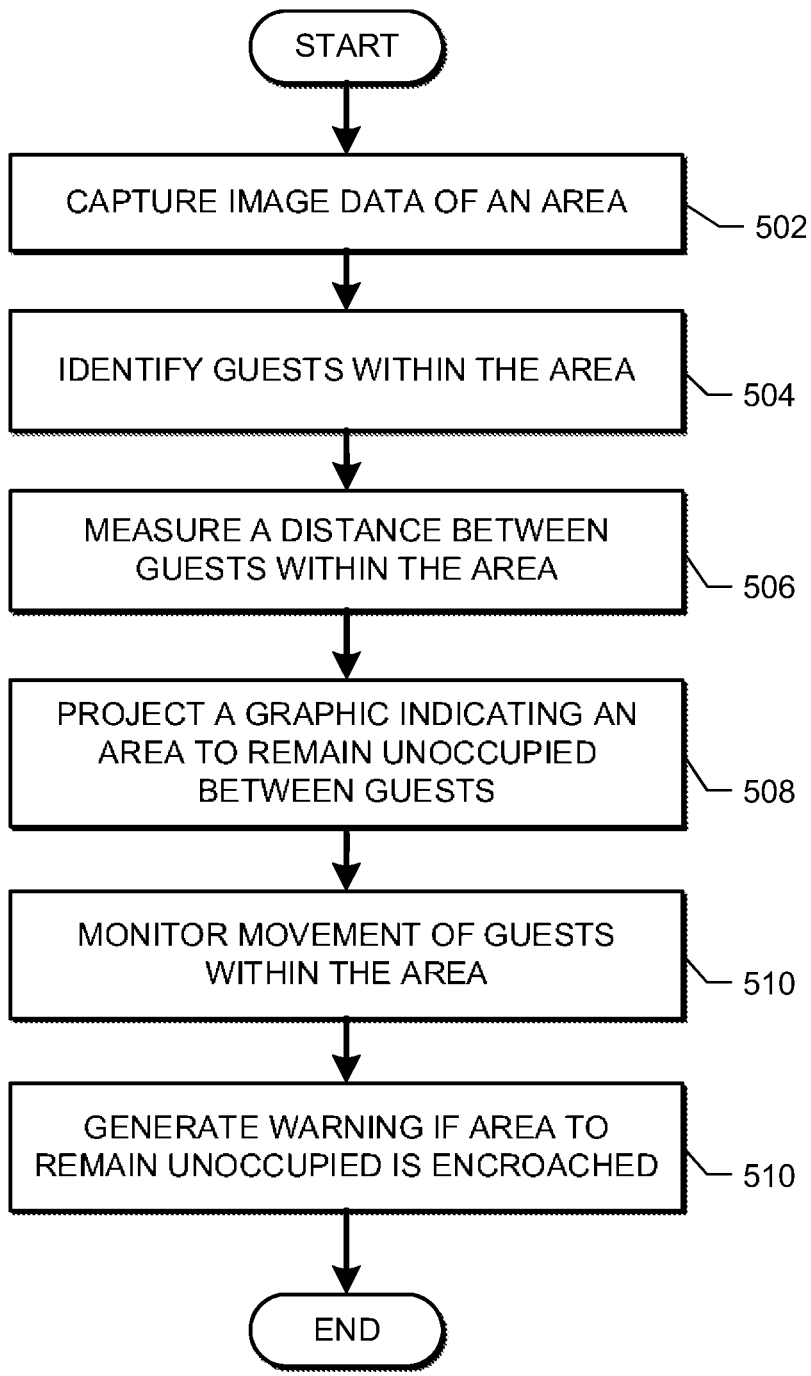
FIG. 5 illustrates an example process for monitoring spatial distancing, in accordance with various aspects of the subject technology.

FIG. 5 illustrates an example process 500 for monitoring spatial distancing, in accordance with various aspects of the subject technology. At step 502, a tracking module captures image data of an area using a camera. At step 504, the image data is processed by a measurement module to identify guests within the area and at step 506, the measurement module measures a distance between guests. At step 508, based on the measured distance, a graphics module selects a graphic for projection by the tracking module to inform a guest of an area to remain unoccupied between guests. At step 510, image data is continuously captured and processed to monitor movement of guests within the area. At step 512, should a guest encroach on the area to remain unoccupied, a warning is generated to alert the guest to request compliance with spatial distancing requirements.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
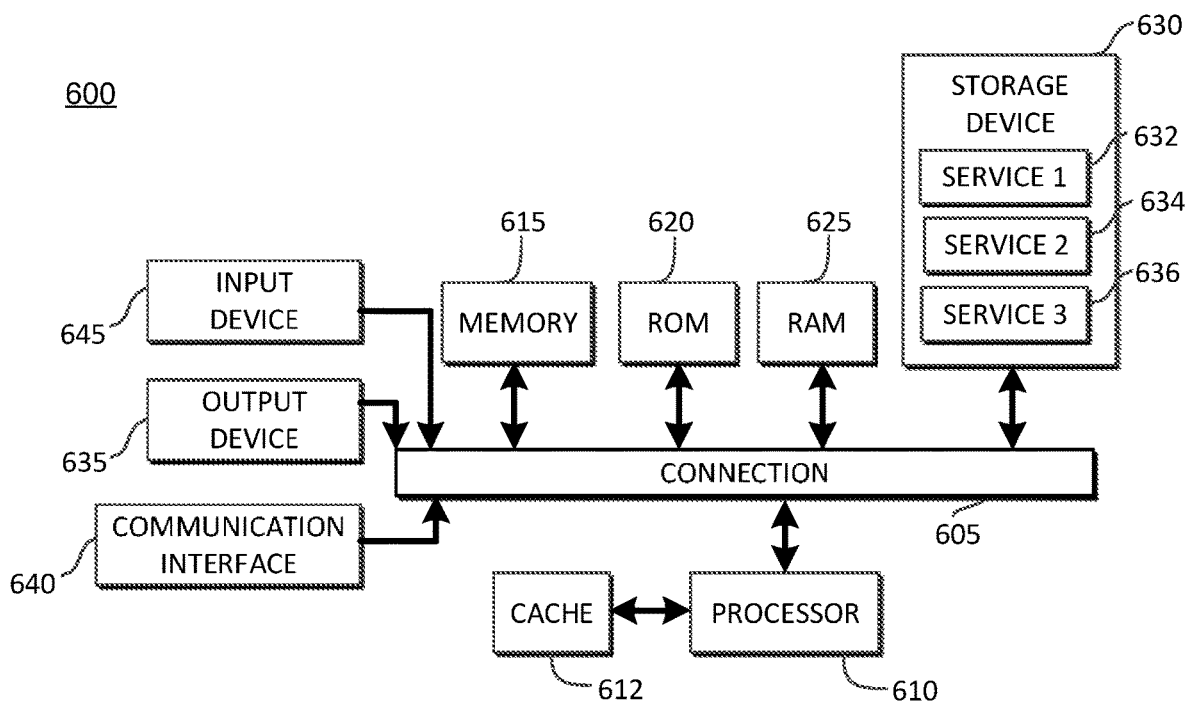
FIG. 6 illustrates an example of a system configured to dynamically monitor spatial distancing using a spatial monitoring platform, in accordance with various aspects of the subject technology.

FIG. 6 illustrates an example of a system 600 configured to dynamically monitor spatial distancing using a spatial monitoring platform, in accordance with various aspects of the subject technology. A spatial monitoring platform, which some implementations of the subject technology are implemented, may include various types of computer readable media and interfaces for various other types of computer readable media. One or more components of the platform are in communication with each other using connection 605. Connection 605 can be a physical connection via a bus, or a direct connection into processor 610, such as in a chipset architecture. Connection 605 can also be a virtual connection, networked connection, or logical connection.

In some embodiments system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

System 600 includes at least one processing unit (CPU or processor) 610 and connection 605 that couples various system components including system memory 615, such as read only memory (ROM) 620 and random access memory (RAM) 625 to processor 610. Computing system 600 can include a cache 612 of high-speed memory connected directly with, in close proximity to, or integrated as part of processor 610.

Connection 605 also couples tracking modules to a network through the communication interface 640. In this manner, the tracking modules can be a part of a network of computers (such as a local area network ("LAN"), a wide area network ("WAN"), or an Intranet, or a network of networks, such as the Internet.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art, and may include, for example, printers and display devices, such as cathode ray tubes (CRT) or liquid crystal displays (LCD). Some implementations include devices such as a touch screen that functions as both input and output devices. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

It will be appreciated that computing system 600 can have more than one processor 610, or be part of a group or cluster of computing devices networked together to provide greater processing capability.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray discs, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A spatial monitoring platform, comprising:
   one or more processors;
   a communications interface coupled to the one or more processors; and
   a computer-readable medium coupled to the one or more processors, wherein the computer-readable medium comprises instructions, which when executed by the processors, cause the processors to perform operations comprising:
   receiving environmental data from one or more tracking modules, wherein the environmental data corresponds with an area;
   processing the environmental data to identify a first person and a second person within the area;
   determining a distance between the first person and the second person;
   projecting a graphic into the area, wherein the graphic is configured to indicate an amount of space to be kept between the first person and the second person to comport with a distancing policy;
   monitoring movement of the first person and the second person within the area;
   altering the graphic projected into the area in response to movement of the first person with respect to the second person; and
   wherein the processors are further configured to execute operations comprising:
   processing the environmental data to identify a party of two or more persons within the area; and
   projecting a second graphic into the area, wherein the second graphic is configured to indicate a space to be kept between the party and at least one of the first person and second person, wherein the space to be kept between the party and the at least one of the first person and second person is larger than the space to be kept between the first person and the second person.

2. The spatial monitoring platform of claim 1, wherein the graphic is configured to provide a warning, different from the graphic, to one or more of the first person or the second person to indicate that an increased distance of physical separation is required.

3. The spatial monitoring platform of claim 1, wherein the distancing policy is based on a size of the area.

4. The spatial monitoring platform of claim 1, wherein the processors are further configured to execute operations comprising:
   generating a notification indicating that the distancing policy has been violated by the first person or the second person; and
   sending the notification to a user of the spatial monitoring platform.

5. The spatial monitoring platform of claim 1, wherein the processors are further configured to execute operations comprising:
   generating a notification indicating that the distancing policy has been violated by the first person or the second person; and
   sending the notification to a client device associated with one or more of the first person or the second person.

6. The spatial monitoring platform of claim 1, wherein the environmental data comprises one or more of: image data, motion data, temperature data, acoustic data, or LiDAR sensor data.

7. A computer-implemented method, comprising:
   receiving environmental data from one or more tracking modules, wherein the environmental data corresponds with an area;
   processing the environmental data to identify a first person and a second person within the area;
   determining a distance between the first person and the second person;
   projecting a graphic into the area, wherein the graphic is configured to indicate an amount of space to be kept between the first person and the second person to comport with a distancing policy;
   monitoring movement of the first person and the second person within the area; and
   altering the graphic projected into the area in response to movement of the first person with respect to the second person; and
   wherein the processors are further configured to execute operations comprising:
      processing the environmental data to identify a party of two or more persons within the area; and
      projecting a second graphic into the area, wherein the second graphic is configured to indicate a space to be kept between the party and at least one of the first person and second person, wherein the space to be kept between the party and the at least one of the first person and second person is larger than the space to be kept between the first person and the second person.

8. The method of claim 7, wherein the graphic is configured to provide a warning, different from the graphic, to one or more of the first person or the second person to indicate that an increased distance of physical separation is required.

9. The method of claim 7, wherein the distancing policy is based on a size of the area.

10. The method of claim 7, further comprising:
    generating a notification indicating that the distancing policy has been violated by the first person or the second person; and
    sending the notification to a user of a spatial monitoring platform.

11. The method of claim 7, further comprising:
    generating a notification indicating that the distancing policy has been violated by the first person or the second person; and
    sending the notification to a client device associated with one or more of the first person or the second person.

12. The method of claim 7, wherein the environmental data comprises one or more of: image data, motion data, temperature data, acoustic data, or LiDAR sensor data.

13. A non-transitory computer-readable storage medium comprising instructions stored therein, which when executed by one or more processors, cause the processors to perform operations comprising:
    receiving environmental data from one or more tracking modules, wherein the environmental data corresponds with an area;
    processing the environmental data to identify a first person and a second person within the area;
    determining a distance between the first person and the second person;
    projecting a graphic into the area, wherein the graphic is configured to indicate an amount of space to be kept between the first person and the second person to comport with a distancing policy;
    monitoring movement of the first person and the second person within the area;
    altering the graphic projected into the area in response to movement of the first person with respect to the second person; and
    wherein the processors are further configured to execute operations comprising:
       processing the environmental data to identify a party of two or more persons within the area; and
       projecting a second graphic into the area, wherein the second graphic is configured to indicate a space to be kept between the party and at least one of the first person and second person, wherein the space to be kept between the party and the at least one of the first person and second person is larger than the space to be kept between the first person and the second person.

14. The non-transitory computer-readable storage medium of claim 13, wherein the graphic is configured to provide a warning, different from the graphic, to one or more of the first person or the second person to indicate that an increased distance of physical separation is required.

15. The non-transitory computer-readable storage medium of claim 13, wherein the distancing policy is based on a size of the area.

16. The non-transitory computer-readable storage medium of claim 13, wherein the instructions are further configured to cause the processors to perform operations comprising:
    generating a notification indicating that the distancing policy has been violated by the first person or the second person; and
    sending the notification to a user of a spatial monitoring platform.

17. The non-transitory computer-readable storage medium of claim 13, wherein the instructions are further configured to cause the processors to perform operations comprising:
    generating a notification indicating that the distancing policy has been violated by the first person or the second person; and sending the notification to a client device associated with one or more of the first person or the second person.

\* \* \* \* \*